(12) United States Patent
Tribbett

(10) Patent No.: US 8,190,675 B2
(45) Date of Patent: May 29, 2012

(54) METHOD AND SYSTEM FOR PROVIDING ACCESS TO REMOTELY HOSTED SERVICES THROUGH A NORMALIZED APPLICATION PROGRAMMING INTERFACE

(75) Inventor: David Tribbett, Key Colony Beach, FL (US)

(73) Assignee: inDitto, LLC, Berwyn, PA (US)

( * ) Notice: Subject to any disclaimer, the term of this patent is extended or adjusted under 35 U.S.C. 154(b) by 155 days.

(21) Appl. No.: 12/726,284

(22) Filed: Mar. 17, 2010

(65) Prior Publication Data

US 2011/0196914 A1    Aug. 11, 2011

Related U.S. Application Data

(60) Provisional application No. 61/303,581, filed on Feb. 11, 2010.

(51) Int. Cl.
G06F 15/16 (2006.01)
(52) U.S. Cl. ......................... 709/203; 709/230
(58) Field of Classification Search .................. 709/203, 709/230
See application file for complete search history.

(56) References Cited

U.S. PATENT DOCUMENTS

| | | | |
|---|---|---|---|
| 6,041,344 A * | 3/2000 | Bodamer et al. | 709/203 |
| 6,226,649 B1 * | 5/2001 | Bodamer et al. | 709/203 |
| 6,310,889 B1 * | 10/2001 | Parsons et al. | 370/466 |
| 6,434,568 B1 * | 8/2002 | Bowman-Amuah | 1/1 |
| 7,096,249 B2 * | 8/2006 | Rajic et al. | 709/201 |
| 8,015,274 B2 * | 9/2011 | Firley et al. | 709/223 |
| 2003/0187983 A1 * | 10/2003 | Rajic et al. | 709/225 |
| 2009/0210482 A1 * | 8/2009 | Wynn et al. | 709/203 |

FOREIGN PATENT DOCUMENTS

| EP | 1126681 A2 | 8/2001 |
|---|---|---|
| EP | 1993254 A1 | 11/2008 |

OTHER PUBLICATIONS

Bussard et al., *An Approach to Identity Management for Service Centric Systems*, ServiceWave 2008, LNCS 5377, Springer Berlin, Berlin, Germany, Dec. 10, 2008, pp. 254-265.
International Search Report and Written Opinion, PCT/US2010/060120, May 6, 2011, 8 pgs.
Meng, et al., *Building Efficient and Effective Metasearch Engines*, ACM Computing Surveys, ACM, New York, NY, vol. 34, No. 1, Mar. 2002, pp. 48-89.
Sheth et al., *Federated Database Systems for Managing Distributed, Heterogeneous, and Autonomous Databases*, ACM Computing Surveys, ACM, New York, NY, vol. 22, No. 3, Sep. 1990, pp. 183-236.

* cited by examiner

*Primary Examiner* — Brian P Whipple
(74) *Attorney, Agent, or Firm* — Morgan, Lewis & Bockius LLP

(57) ABSTRACT

A server system having one or more processors and memory receives, from a client, a generic request to access remotely hosted services. The server system identifies a plurality of respective remotely hosted services that are each associated with a respective API. For each respective remotely hosted service, the server system translates the generic request to a respective API-specific request to access the respective remotely hosted service using API-specific parameters and sends the respective API-specific request to the respective remotely hosted service. In response to the requests, the server system receives, from a plurality of the respective remotely hosted services, respective API-specific responses, where a respective API-specific response for a respective remotely hosted service includes respective content. The server system generates a final response that includes content from two or more of the API-specific responses and transmits the final response to the client.

39 Claims, 9 Drawing Sheets

Request Processing Preferences 244

| Command 1 ID 302-1 | Request Processing Instructions (Parallel Requests) 304-1 | Remotely Hosted Service ID<br>Remotely Hosted Service ID<br>Remotely Hosted Service ID<br>Remotely Hosted Service ID<br>• • • |
|---|---|---|
| Command 2 ID 302-2 | Request Processing Instructions (Cascading Requests) 304-2 | Remotely Hosted Service ID<br>Remotely Hosted Service ID<br>Remotely Hosted Service ID<br>Remotely Hosted Service ID<br>• • • |
| ⋮ | ⋮ | ⋮ |
| Command P ID 302-Y | Request Processing Instructions 304-Y | Remotely Hosted Service ID<br>Remotely Hosted Service ID<br>Remotely Hosted Service ID<br>Remotely Hosted Service ID<br>• • • |

Security Credentials 248

| Remotely Hosted Service 1 ID 306-1 | User Name 308-1 | Password 310-1 | API Key 312-1 | • • • |
|---|---|---|---|---|
| Remotely Hosted Service 2 ID 306-2 | User Name 308-2 | Password 310-2 | API Key 312-2 | • • • |
| ⋮ | | | | |
| Remotely Hosted Service X ID 306-X | User Name 308-X | Password 310-X | API Key 312-X | • • • |

Figure 3B

METHOD AND SYSTEM FOR PROVIDING ACCESS TO REMOTELY HOSTED SERVICES THROUGH A NORMALIZED APPLICATION PROGRAMMING INTERFACE

RELATED APPLICATIONS

This application claims priority to U.S. Provisional Application No. 61/303,581, filed Feb. 11, 2010, entitled "Method and System for Providing Access to Remotely Hosted Services Through a Normalized Application Programming Interface," which is incorporated herein by reference in its entirety.

TECHNICAL FIELD

The disclosed embodiments relate generally to providing access to remotely hosted services, and more specifically to normalizing communications between one or more clients and multiple remotely hosted services.

BACKGROUND

In recent years, application programming interfaces (APIs) have begun to play an increasingly important role in defining how remotely hosted services accept and generate information. APIs include protocols offered by remotely hosted services that provide access to third parties to resources associated with the remotely hosted services. APIs are frequently used to manage communication between one or more parties on data networks such as the Internet. For example, APIs mediate communications between merchants and payment providers (e.g., protocols for transmitting payment information to PAYPAL, GOOGLE CHECKOUT, etc.), communications between users and merchants (e.g., protocols for retrieving tracking numbers from FedEx), and communications between users and content repositories (e.g., protocols for retrieving photos from photo sharing websites such as FLICKR, PICASAWEB, PHOTOBUCKET, etc.) among others. APIs are used to access remotely hosted services because they provide direct access to content and other information that is stored and/or collected by the remotely hosted services.

However, the recent proliferation of APIs has created a number of problems for third parties who would like to take advantage of the access to resources that are provided by the APIs. In particular, communication with each API is governed by a set of API-specific requirements. Thus, even when remotely hosted services provide similar functions (e.g., providing access to stored photos over the Internet), the APIs for similar remotely hosted services may have vastly different requirements (e.g., requiring differently formatted requests, different communication protocols, different security credentials, and having different usage limits). Additionally the requirements of a single API may be updated by the remotely hosted service at any time. Thus, as the number of APIs increases the cost of monitoring requirements and changes to requirements for a growing number of APIs is increasingly burdensome.

SUMMARY

Therefore, it would be advantageous to provide users with way to access these remotely hosted services that reduces or eliminates the need to monitor and adjust to changes in APIs for the remotely hosted services. In particular, a system and/or method that enables users to access remotely hosted services that use a plurality of distinct APIs through a single request and receive a single reply would vastly increase the efficiency of interacting with the remotely hosted services.

In one aspect of the system and method, a server system having one or more processors and memory: receives, from a client, a generic request to access remotely hosted services. The generic request uses generic parameters. The server system identifies a plurality of respective remotely hosted services that correspond to the generic request. The remotely hosted services are each associated with a respective API. For each respective remotely hosted service, the server system translates the generic request to a respective API-specific request to access the respective remotely hosted service using API-specific parameters. The API-specific request and the API-specific parameters are specific to the respective API of the respective remotely hosted service. For each of the plurality respective remotely hosted services, the server system sends the respective API-specific request to the respective remotely hosted service. In response to the requests, the server system receives, from a plurality of the respective remotely hosted services, respective API-specific responses, where a respective API-specific response for a respective remotely hosted service includes respective content. The server system generates a final response that includes content from two or more of the API-specific responses and transmits, to the client, the final response.

In some embodiments, the generic request includes a request to perform a generic-named operation, and translating the generic request to a respective API-specific request includes translating the request to perform the generic-named operation to an API-specific request to perform an API-specific-named operation at the respective remotely hosted service, wherein the API-specific-named operation is analogous to the generic-named operation. In some embodiments, the generic request includes a request to perform an operation using a generic name for the operation; translating the generic request to a respective API-specific request includes translating the generic name for the operation to an API-specific name for the operation; and sending the respective API-specific request to the respective remotely hosted service includes sending, to the respective remotely hosted service, a request to perform the operation using the API-specific name for the operation.

In some embodiments, the server system communicates with the client using a first predefined communication protocol to receive the generic request and to send the final response; and communicates with a respective remotely hosted service using a second predefined communication protocol that is distinct from the first predefined communication protocol to send a respective API-specific request and to receive a respective API-specific response.

In some embodiments, a user account is stored at the server system, the user account includes previously registered user-supplied security credentials associated with a particular remotely hosted service and sending a particular API-specific request from the server system to the particular remotely hosted service includes authenticating the particular API-specific request using the user-supplied security credentials for the particular remotely hosted service. In some embodiments, the generic request includes identifiers for the plurality of respective remotely hosted services. In some embodiments, a user account associated with the generic request includes a definition for a command; the definition for the command includes identifiers for the plurality of respective remotely hosted services; and the generic request is associated with the user account and includes the command.

In some embodiments, sending respective API-specific requests to the respective remotely hosted services includes:

sending a first API-specific request to a first remotely hosted service; receiving a first API-specific response from the first remotely hosted service; sending a second API-specific request to a second remotely hosted service that is distinct from the first remotely hosted service, where the second API-specific request is based at least in part on the first API-specific response; and receiving a second API-specific response from the second remotely hosted service. In some embodiments, the respective API-specific response for a respective remotely hosted service includes one or more respective API-specific return parameters; and the server system translates the one or more respective API-specific return parameters into generic return parameters.

In some embodiments, generating the final response includes, for each of the respective API-specific responses, translating the API-specific response to a respective generic response; and combining a plurality of the respective generic responses from a plurality of distinct remotely hosted services to generate the final response. In some embodiments, the server system processes multiple respective API-specific responses without modifying the content of the multiple respective API-specific responses, and the final response includes the unmodified content of the multiple respective API-specific responses. In some embodiments, the final response is in a customized response format specified by a user of the client.

BRIEF DESCRIPTION OF THE DRAWINGS

FIGS. 3A-3B are block diagrams illustrating structures for the server system.

Like reference numerals refer to corresponding parts throughout the drawings.

DESCRIPTION OF EMBODIMENTS

Figure 1:
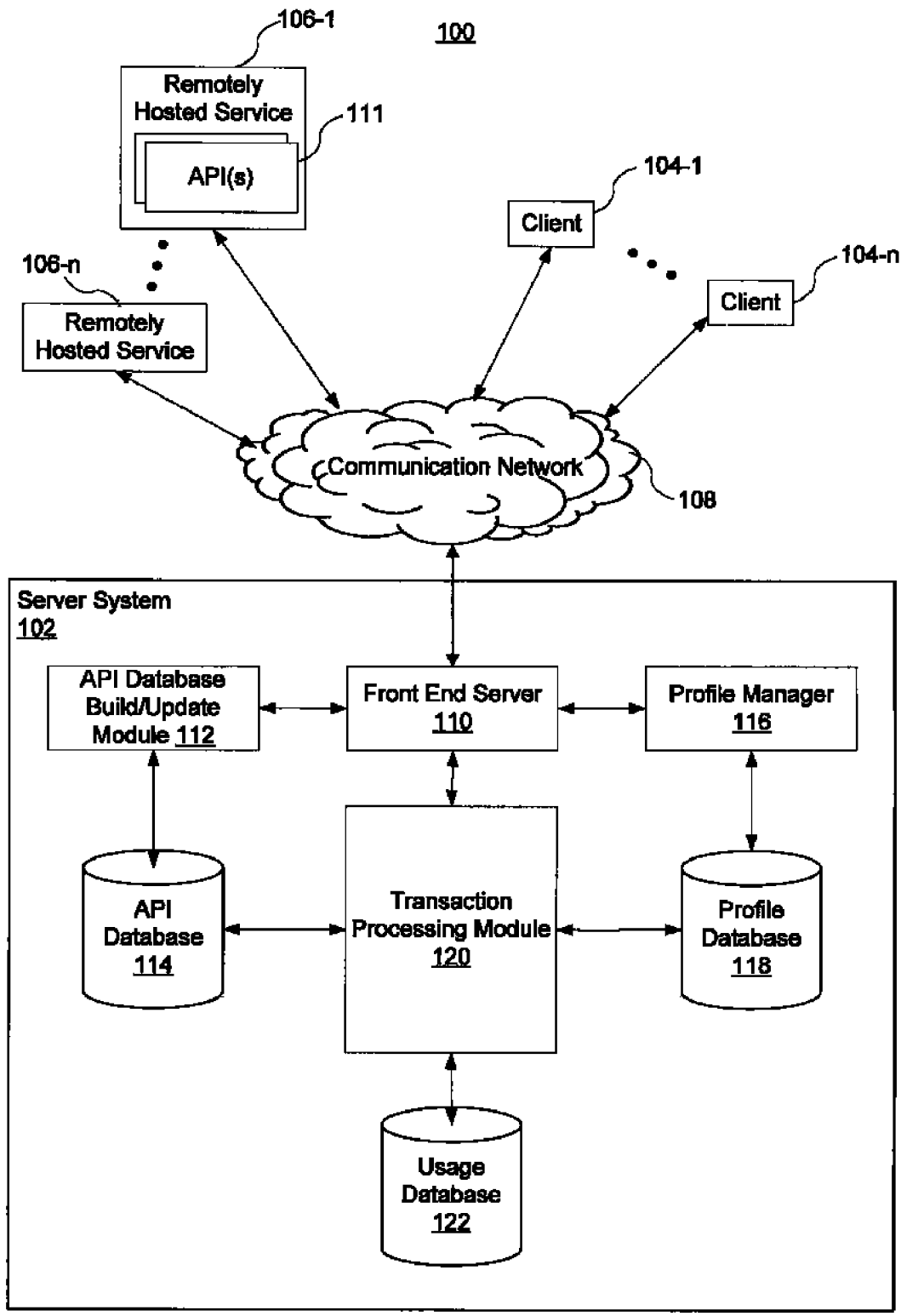
FIG. 1 is a block diagram of a distributed client-server computing system.

FIG. 1 is a block diagram of a distributed client-server computing system 100 including a server system 102 according to some embodiments of the invention. The server system 102 is connected to a plurality of clients 104 and, remotely hosted services 106 through one or more communication networks 108. A remotely hosted service 106 may include one or more application programming interfaces (i.e., APIs) 111 for accessing content or services made available by the remotely hosted service 106. It should be understood that a remotely hosted service 106 could have multiple APIs for accessing different content and services of the remotely hosted service 106. For example, a remotely hosted service that provides map services may include both a map tile retrieval API for retrieving images of map tiles and a driving directions API for retrieving driving directions.

The client 104 (sometimes called a "client system," or "client device" or "client computer") may be any computer or device through which a user of the client 104 can submit service requests to and receive a response from the server system 102. Examples of clients 104 include, without limitation, desktop computers, laptop computers, tablet computers, mobile devices such as mobile phones, personal digital assistants, set-top boxes, various electronic devices, or any combination of the above. A respective client 104 may contain one or more client applications for submitting requests to the server system 102. For example, the client application can be a web browser or other type of application that permits a user to search for, browse, and/or use information (e.g., web pages and web services) that is accessible through communication network 108.

The communication network(s) 108 can be any wired or wireless local area network (LAN) and/or wide area network (WAN), such as an intranet, an extranet, the Internet, or a combination of such networks. In some embodiments, the communication network 108 uses the HyperText Transport Protocol (HTTP) and the Transmission Control Protocol/Internet Protocol (TCP/IP) to transport information between different devices or systems. The HTTP permits client devices to access various information items available on the Internet via the communication network 108. The various embodiments of the invention, however, are not limited to the use of any particular protocol.

In some embodiments, the server system 102 includes a front end server 110, an API database build/update module 112, an API database 114, a profile manager 116, a profile database 118, a transaction processing module 120, and a usage database 122.

In some embodiments, the front end server 110 is configured to communicate with remotely hosted services 106 and clients 104 through the communication network 108. The API database build/update module 112 identifies remotely hosted services 106 and APIs 111, and stores information about the APIs in the API database 114. A variety of processes can be used to populate and update the API database 114, using varying degrees of automation and human participation. Processes for populating and updating the API database 114 are beyond the scope of this document.

The server system 102 receives data from clients 104 through the communication network 108. In some embodiments the data received by the server system 102 includes profile data for a respective client 104 or for a user associated with the client 104. The front end server 110 receives the profile data and passes the profile data to the profile manager 116, which stores the profile data in a profile database 118 for later use.

In some embodiments the front end server 110 receives data from a client that includes a generic request to access content or services from one of the remotely hosted services 106 via one of the APIs. Requests to access content or services from one of the remotely hosted services are passed to the transaction processing module 120. The transaction processing module 120 identifies, based on the request, appropriate APIs of the remotely hosted services 106 to which to send the request and (optionally) data from the profile database 118. For some requests, the identified APIs include APIs from distinct remotely hosted services. For some requests, at least two of the APIs are from the same remotely hosted service. After identifying the appropriate APIs of the remotely hosted services 106 to which to send the request, the transaction processing module 120 subsequently translates the request based on data in the API database 114 that is associated with the remotely hosted services 106, and sends respective translated requests to each of the identified remotely hosted services 106.

In some embodiments, one or more of the remotely hosted services 106 respond to the request by sending responses to the front end server 110. The transaction processing module 102 receives the responses, generates a final response and sends the final response to the requesting client 104 through the communication network 108. In some embodiments, usage data about the request from the client 104, the response from the remotely hosted services 106 and/or the final response to the client 104 is stored by the transaction processing module 102 in a usage database 122.

It should be understood that while server system 102 is shown as a single server in FIG. 1, in other embodiments the server system 102 includes multiple servers. When the server system 102 includes multiple servers, the servers may be coupled together directly, or by a local area network (LAN), or via the communication network 108.

Figure 2:
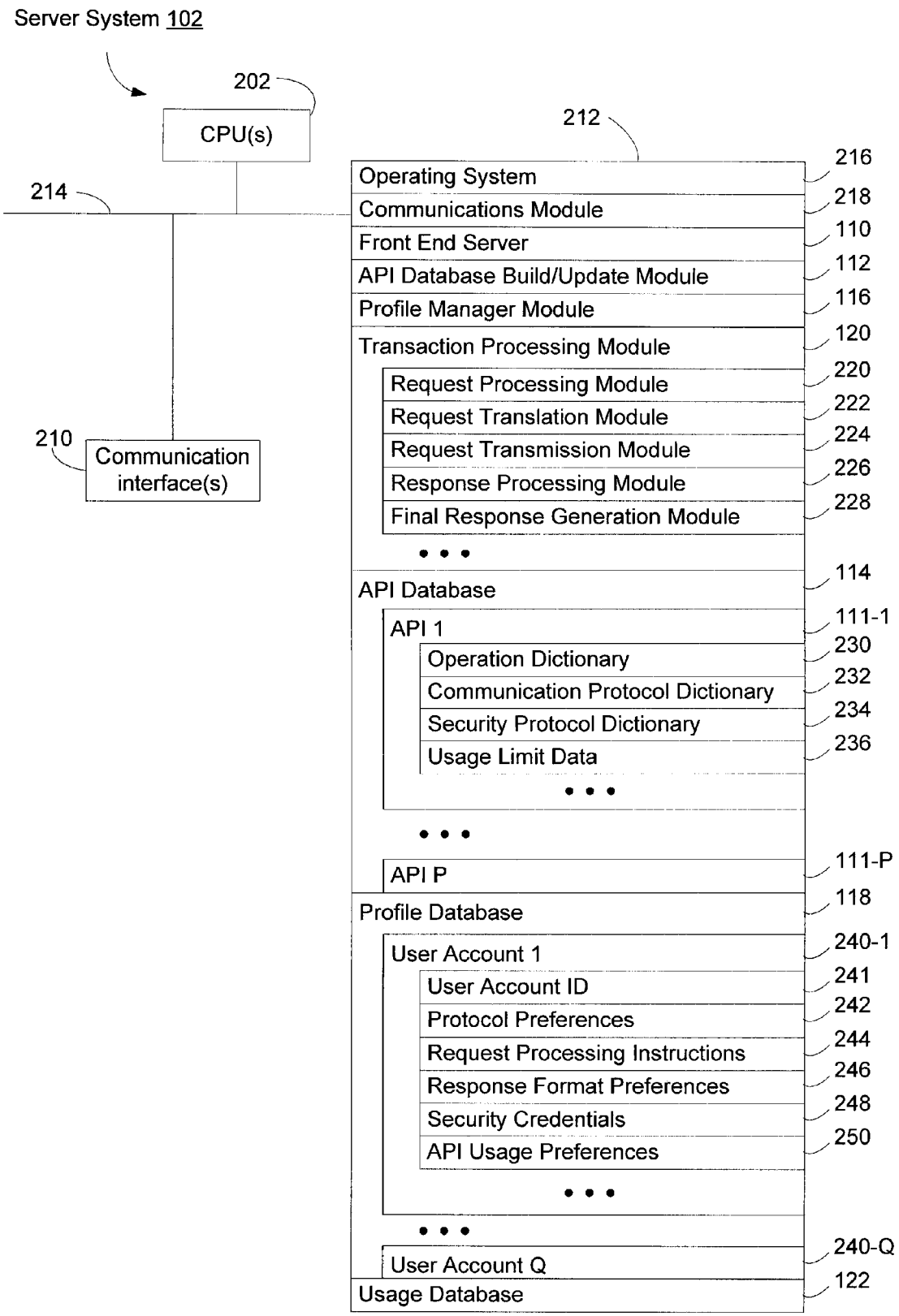
FIG. 2 is a block diagram of a server system for providing access to remotely hosted services.

FIG. 2 is a block diagram illustrating a server system 102 in accordance with one embodiment of the present invention. The server system 102 typically includes one or more processing units, e.g., CPU(s) 202, one or more network or other communications interfaces 210, memory 212, and one or more communication buses 214 for interconnecting these components. Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a computer readable storage medium. In some embodiments, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the server system 102 to other computers (e.g., clients 104 and/or remotely hosted services 106 in FIG. 1) via the one or more communication network interfaces 210 (wired or wireless) and one or more communication networks (e.g., network 108 in FIG. 1), such as the Internet, other wide area networks, local area networks, metropolitan area networks, and so on;
- a front end server 110 that is used to communicate between modules within the server system 102 and to pass messages from other computers (e.g., clients 104 and/or remotely hosted services 106 in FIG. 1) to the modules within the server system 102;
- an API database build/update module 112 that is used to store and update parameters associated with identified APIs in an API database 114; optionally, the API database build/update module 112 identifies APIs that are associated with respective remotely hosted services 106;
- a profile manager module 116 that is used to receive and manage profile data associated with user profiles, including storing the profile data in a profile database 118;
- a transaction processing module 120 that is used to process requests from clients to access content or services from one or more of the remotely hosted services, in some embodiments the transaction processing module 120 includes one or more of: a request processing module 220 for receiving requests from clients 104, identifying profile data associated with the requesting clients and identifying remotely hosted services 106; a request translation module 222 for translating the requests based on APIs associated with the identified remotely hosted services 106; a request transmission module 224 for transmitting the translated requests to remotely hosted services 106; a response processing module 226 for receiving responses from the remotely hosted services 106 and formatting the responses in accordance with profile data in the profile database for the requesting client 104; and a final response generation module 228 for combining the formatted responses to generate a final response for the client 104;
- an API database 114 that is used to store information about APIs (e.g., API 1 111-1 through API P 111-P); in some embodiments an entry for a respective API in the API database 114 includes one or more of: an operation dictionary 230 that includes information regarding content and services that can be requested from a remotely hosted service 106 associated with the respective API and appropriate syntax for making the requests; a communication protocol dictionary 232 that includes information regarding communication protocols that are recognized by the remotely hosted service 106 associated with the respective API; a security protocol dictionary 234 that includes information regarding security protocols that are required by the remotely hosted service 106 associated with the respective API; and usage limit data 236 that includes information regarding usage limits for the API (e.g., limits on the number of requests per user per day);
- a profile database 118 that is used to store information about user accounts (e.g., user account 1 240-1 through user account Q 240-Q), in some embodiments an entry for a respective user account 240 in the profile database 118 includes one or more of: a user account ID 241 for identifying the user of the user account; protocol preferences 242 that include information indicating one or more communication protocols that are preferred by the user for receiving communications from the server system 102; request processing preferences 244 that include information indicating instructions for processing requests associated with the user account (e.g., as discussed in greater detail below with reference to FIG. 3A); response format preferences 246 that include information indicating formatting preferences for final responses sent from the server system 102 to the client 104; security credentials 248 that include security credentials from the user for accessing APIs associated with remotely hosted services (e.g., as discussed in greater detail below with reference to FIG. 3B); and API usage preferences 250 that include information indicating limits on activity for one or more APIs on behalf of the user (e.g., numerical limits on the number of requests sent to an API over the course of a day that use security credentials associated with the user); and
- a usage database 122 that is used to store information that is indicative of communication between the server system 102 and the remotely hosted services 106 and the clients 104; in some embodiments the usage data is stored on a per-user account basis, while in other embodiments the usage data is aggregated for all user accounts or a subset of user accounts.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 212 may store a subset of the modules and data structures identified above. Furthermore, memory 212 may store additional modules and data structures not described above.

Although FIG. 2 shows a "server system," FIG. 2 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a server system and how features are allocated among them will vary from one implementation to another, and may depend in part on the amount of data traffic that the system must handle during peak usage periods as well as during average usage periods.

Attention is now directed towards FIG. 3A, which illustrates a data structure for storing request processing preferences 244 in accordance with some embodiments. As discussed above, the request processing preferences 244 include information indicating instructions for processing requests associated with the user account. The data structures for the request processing preferences 244 may include the following fields, or a subset thereof: one or more command IDs 302, request processing instructions 304 associated with each of the command IDs, and one or more remotely hosted service IDs 306 associated with each of the request processing instructions (e.g., request processing instructions 304-1 for performing a parallel request to all of the associated remotely hosted services). In some embodiments, a command ID is an identifier that is used by the server system 102 to identify previously specified request processing instructions 304 when the server system 102 receives a request from a client 104 that includes a command associated with the command ID 302. It is noted that in some embodiments, request processing preferences 244 may be stored in other data structures than the data structure shown in FIG. 3A, such as two or more tables or other data structures.

These request processing instructions include instructions for the system as to how to process the user's request (e.g., which remotely hosted services to send the request to, how to combine the responses from the remotely hosted services, etc.). As one example, one set of request processing instructions 304-1 includes instructions to perform parallel requests at a plurality of remotely hosted services. For example, instead of explicitly specifying one or more remotely hosted services 106 (e.g., "get photos from FLICKR, PICASAWEB and PHOTOBUCKET") in the request that is sent from the client 104 to the server system 102, the client 104 can create a request that includes a command (e.g., "get photos from photo websites") and the server system 102 will look up a command ID 302-1 that is associated with the command and use the request processing instructions 304-1 associated with the command ID 302-1 to send appropriate requests to respective remotely hosted services 106 identified by the request processing instructions 304-1. In the present example, if the command is "get photos from photo websites" the server system 102 in would send respective requests for photos to FLICKR, PICASAWEB and PHOTOBUCKET.

As another example, one set of request processing instructions 304-2 includes instructions to perform a cascading request, which includes requests to a plurality of remotely hosted services. For example, instead of explicitly specifying one or more remotely hosted services (e.g., "get photos from FLICKR, PICASAWEB and PHOTOBUCKET and then get associated map data from GOOGLE MAPS") in the request that is sent from the client 104 to the server system 102, the client 104 can create a request that includes a command (e.g., "get photos and map data for application X") and the server system 102 will look up a command ID 302-2 that is associated with the command and use the request processing instructions 304-2 associated with the command ID 302-2 to send appropriate requests to respective remotely hosted services 106 identified by the request processing instructions 304-2. In the present example, if the command is "get photos and map data for application X, type=landmark, location=San Francisco, Calif." the server system 102 would send respective requests for photos to FLICKR, PICASAWEB and PHOTOBUCKET (e.g., a request for photos of landmarks in San Francisco), and then, if photos were retrieved from any of these remotely hosted services 106, the server system 102 would identify location data associated with the photos and use the location data to retrieve map data from GOOGLE MAPS.

It should be understood that the above examples are merely for the purposes of illustrating the general principal of storing request processing instructions (e.g., parallel requests and/or cascading requests) in a database, so that a user can initiate the performance of a complicated sequence of requests simply by sending a single request to the server system 102 that includes a predefined command. Enabling the use of such request processing instructions improves the efficiency of performing complex requests to remotely hosted services, thereby improving the speed and efficiency of requests from the client 104.

Attention is now directed towards FIG. 3B, which illustrates a data structure for storing security credentials 248 in accordance with some embodiments. As discussed above, the security credentials 248 include security credentials from the user for accessing APIs associated with remotely hosted services. The data structures for the security credentials 248 may include the following fields, or a subset thereof: one or more remotely hosted service IDs 306 for remotely hosted services with APIs that require security credentials, in some embodiments, for each remotely hosted service ID 306 the security credentials may include one or more of a user name 308, a password 310 and an API key 312 or any other security verification mechanism that is used by the remotely hosted service to restrict access to APIs associated with the remotely hosted service. It should be understood that some remotely hosted services and/or APIs do not require any security credentials, and therefore no security credentials need be stored in the profile database 118 for those remotely hosted services and/or APIs. Similarly, some remotely hosted services and/or APIs may use only a subset of the exemplary security credentials described above, or may use different types of security credentials, and therefore the security credentials stored in the profile database 118 are of the appropriate type for those remotely hosted services and/or APIs. Typically, the security credentials are procured by the users and added to the user account by the user so that the server system 102 can access the APIs using the security credentials of the user. Using security credentials supplied by the user is advantageous in many situations, because the relationship between the remotely hosted service 106 and the user is maintained even while the server system 102 performs intermediary tasks such as translating requests from the client 104 associated with the user to the remotely hosted service 106. Thus, the server system 102 facilitates communication between the client 104 and the remotely hosted services 106 without interfering with the relationship between the client 104 and the remotely hosted service 106. It is noted that in some embodiments, storing security credentials 248 may be stored in other data structures than the data structure shown in FIG. 3B, such as two or more tables or other data structures.

Figure 4:
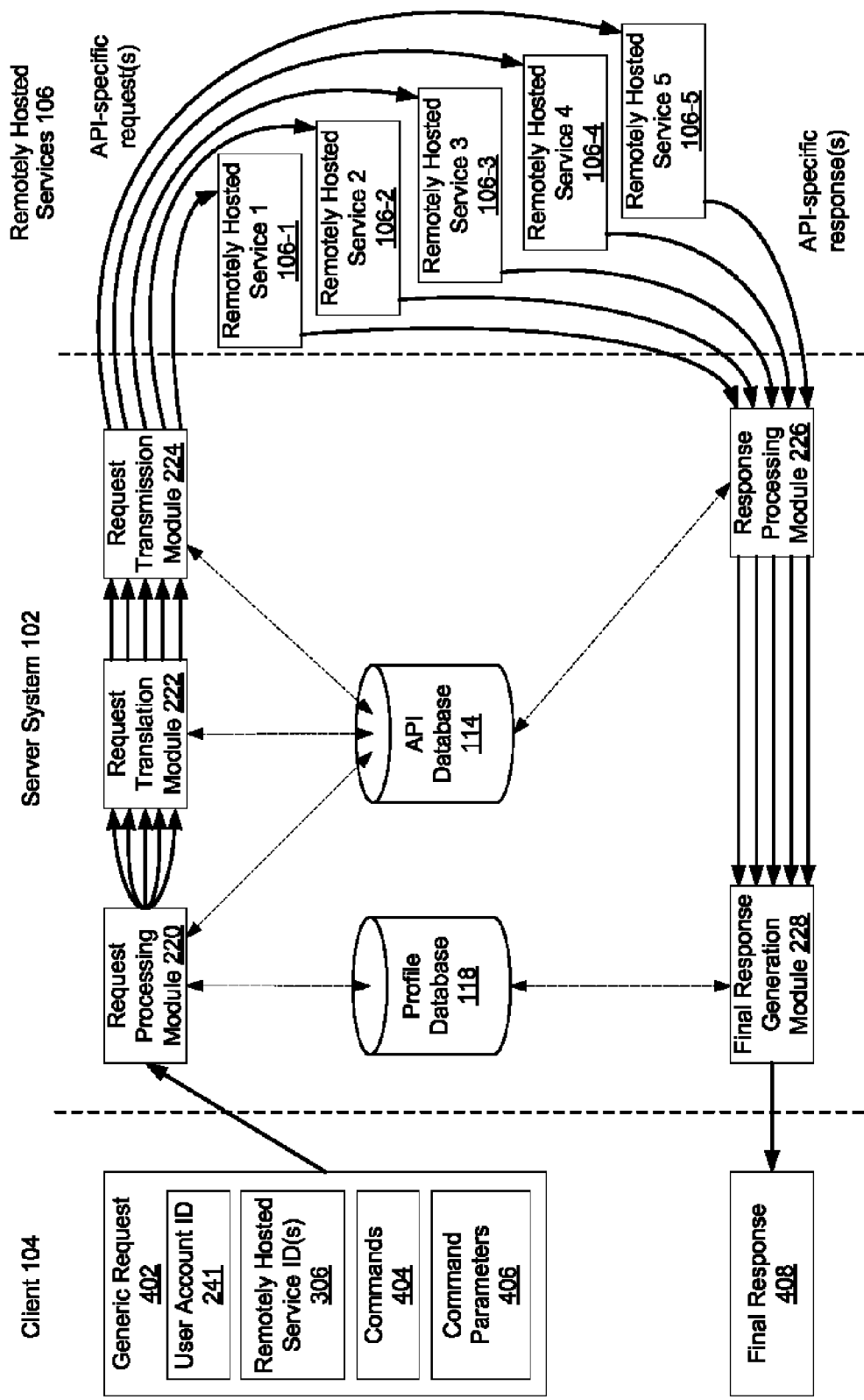
FIG. 4 is a schematic diagram illustrating data flow of data between a client, the server system and multiple remotely hosted services.
Figure 5A:
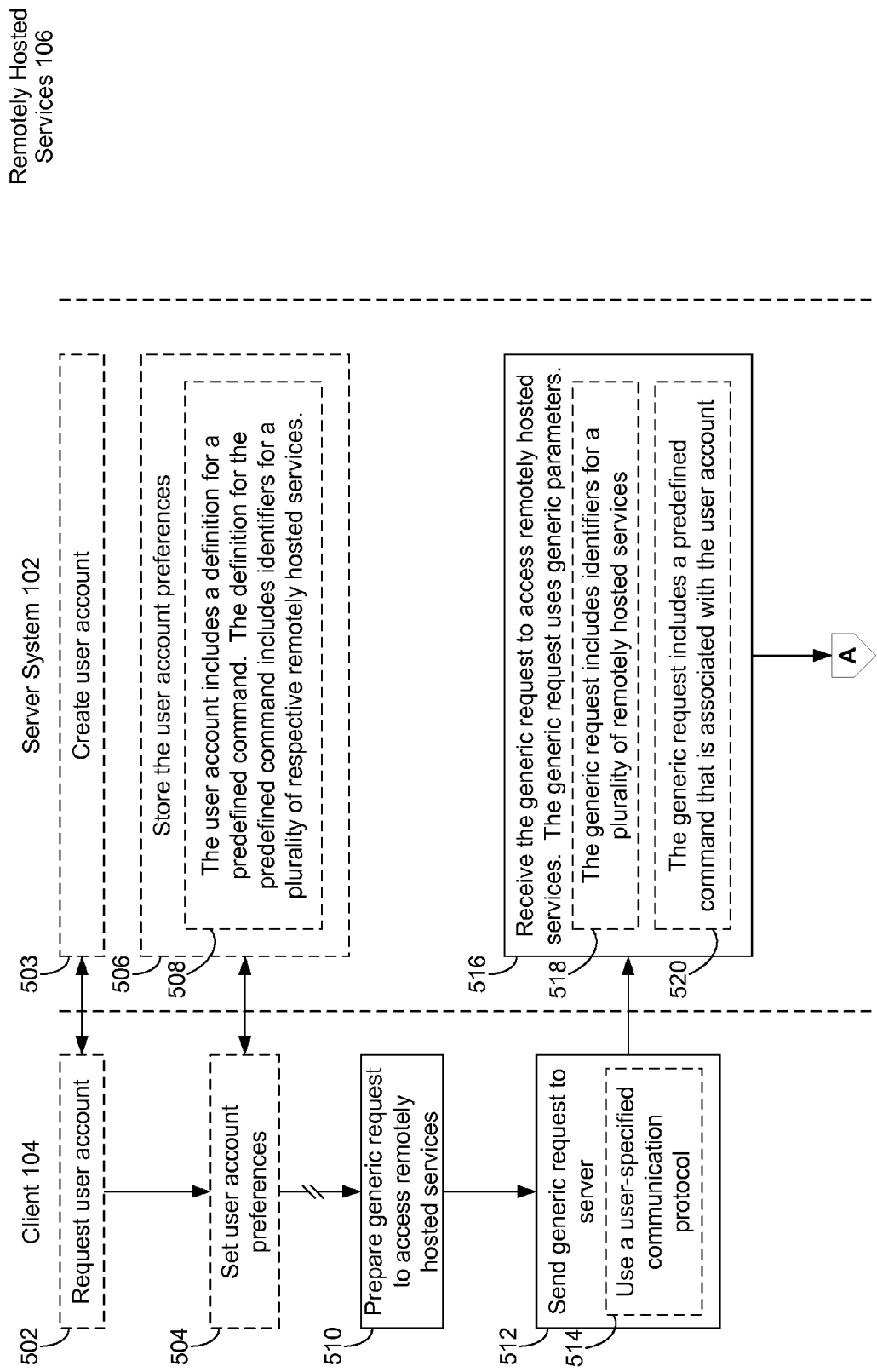
FIGS. 5A-5E is a flowchart representing a method of providing access to remotely hosted services through a normalized application programming interface.
Figure 5B:
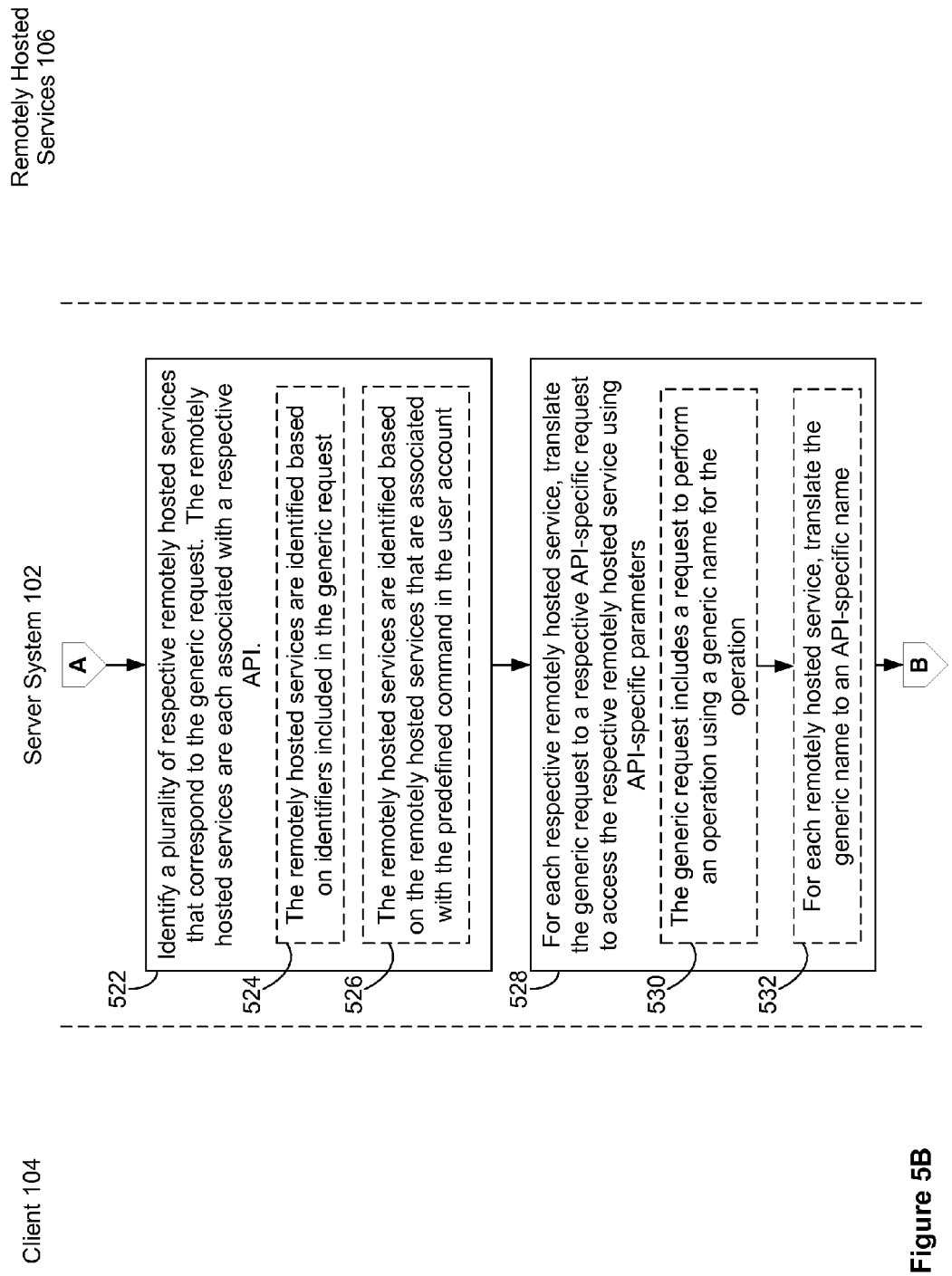
Figure 5C:
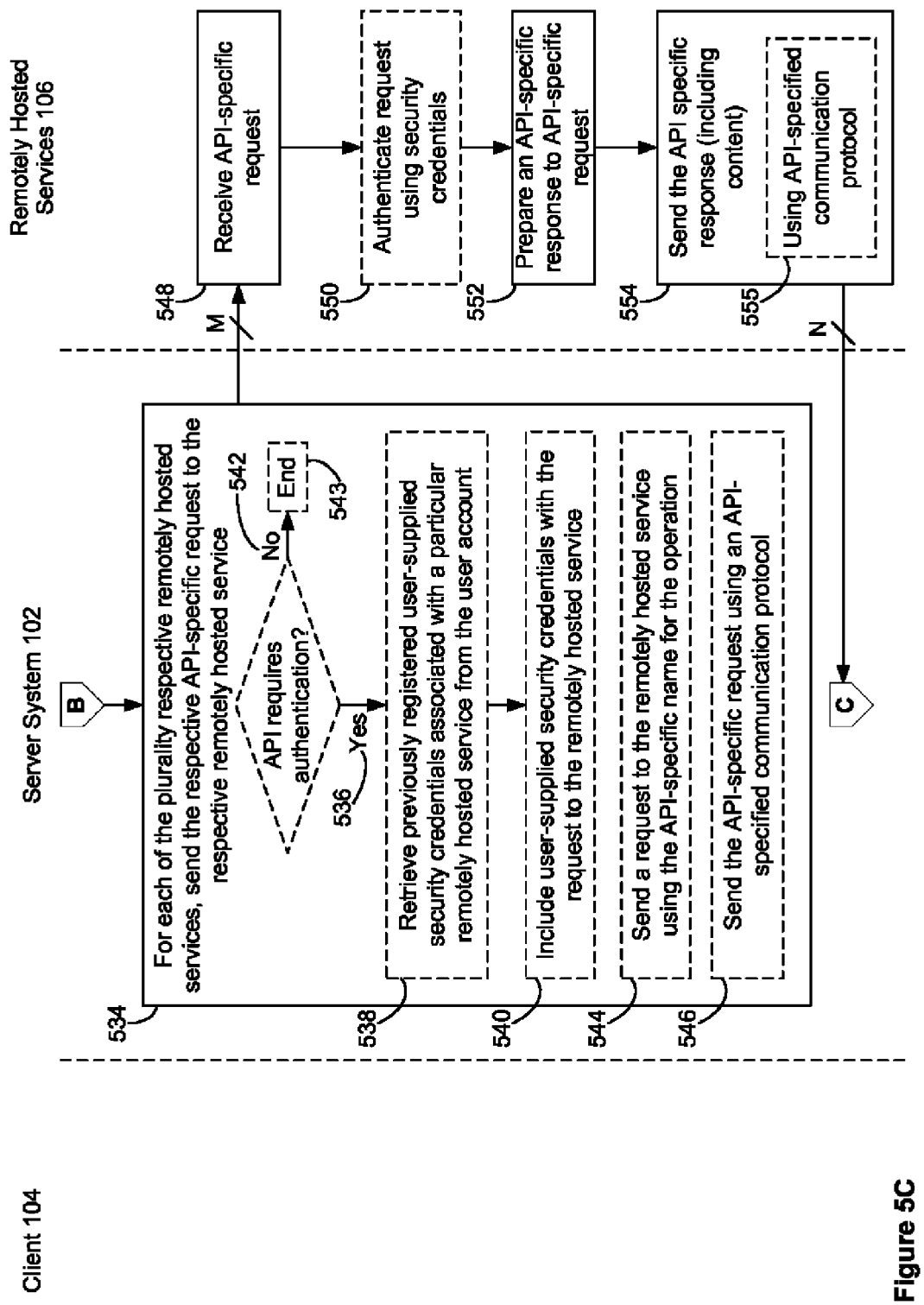
Figure 5D:
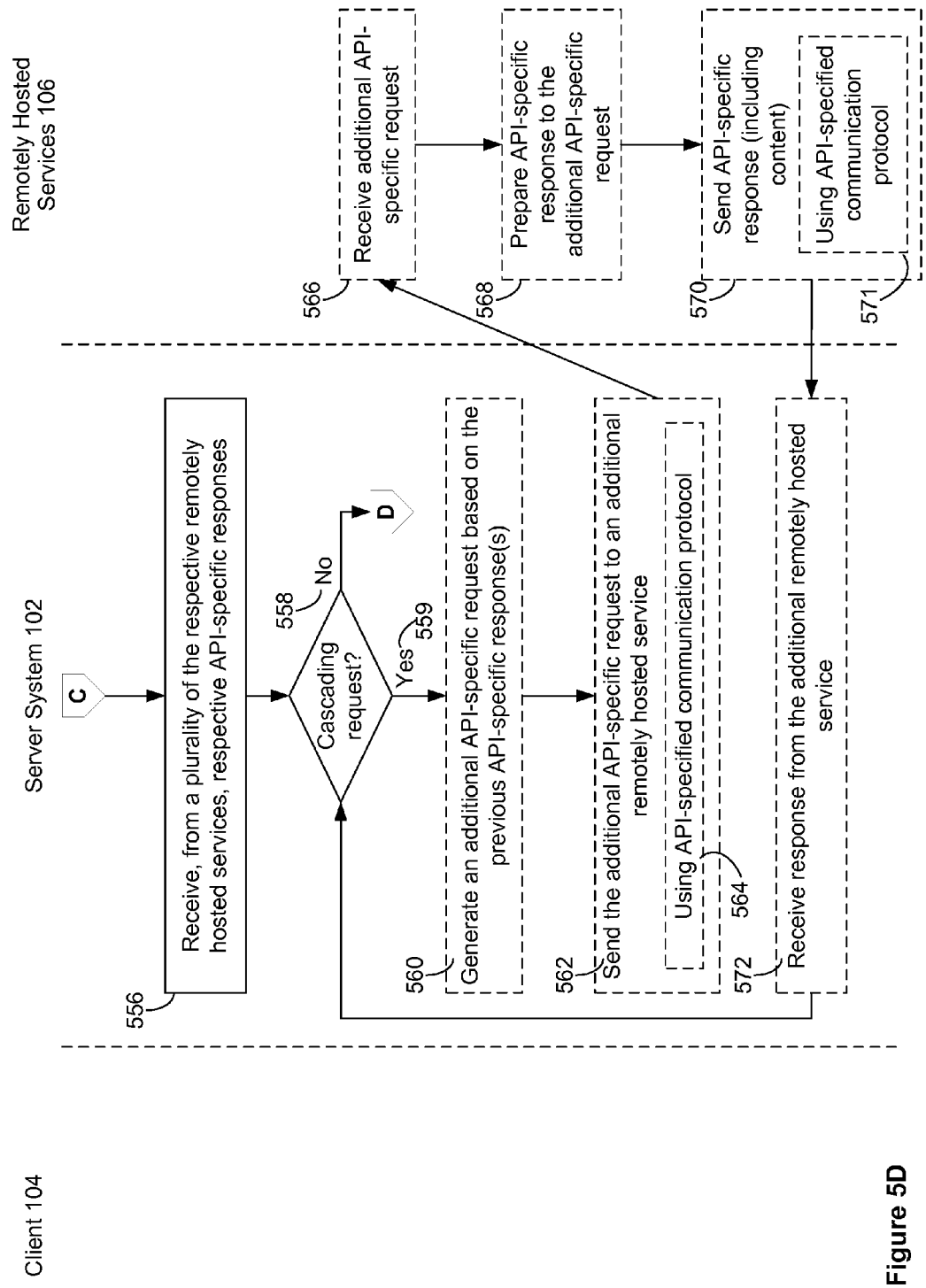
Figure 5E:
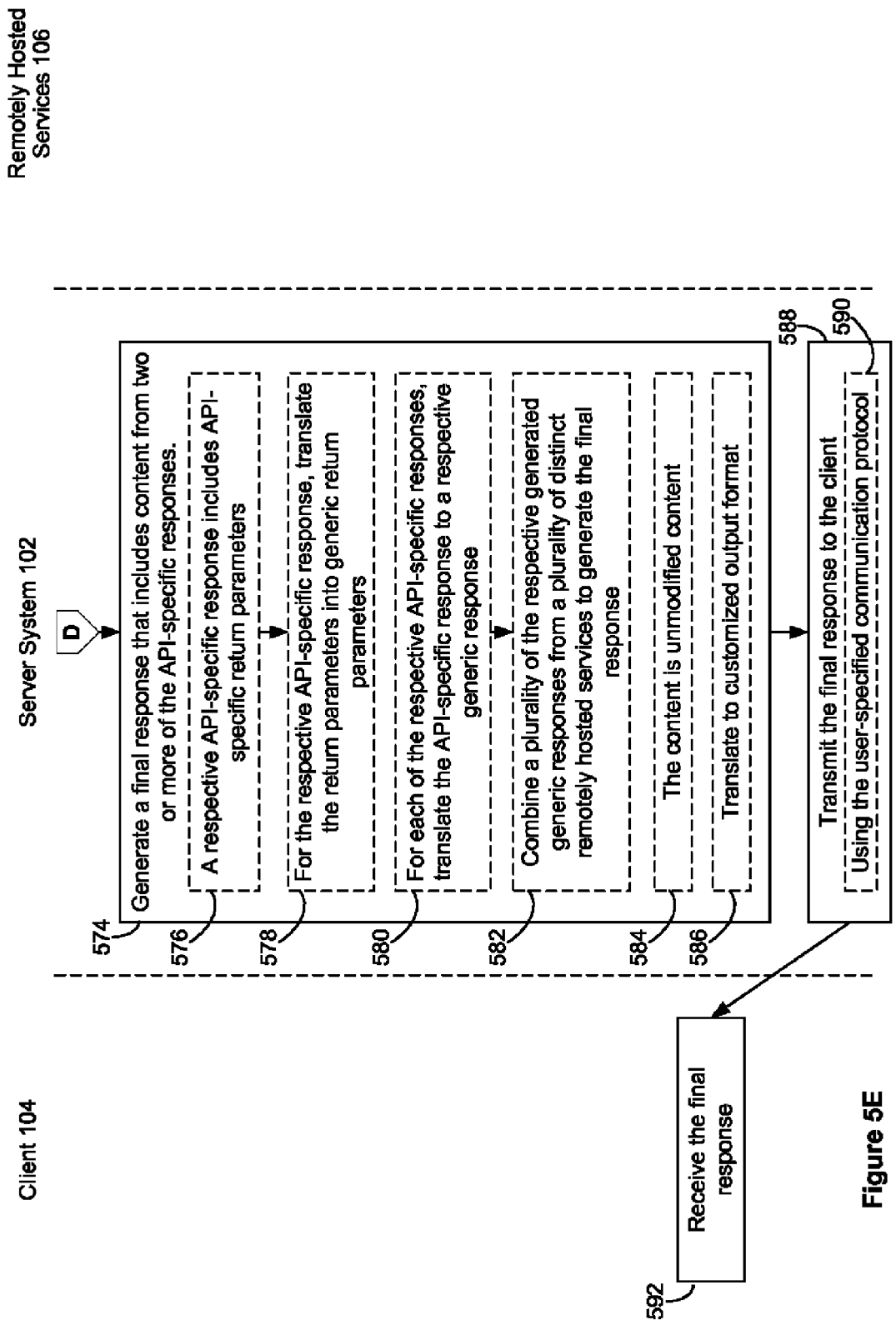

Attention is now directed towards FIG. 4, which schematically illustrates data flows between the client 104, the server system 104 and multiple remotely hosted services 106 in response to a generic request 402 from a client 104. The client generates a generic request 402 that includes one or more of:

- a user account ID 241 that identifies the user account associated with the generic request 402 to the server system 102;
- one or more remotely hosted service IDs 306 that directly indicate specific remotely hosted services (e.g., remotely hosted service 1 106-1) that the request is directed towards;
- one or more commands 404, which are associated with command IDs in the request processing preferences for the user account associated with the request; these commands 404 indirectly indicate specific remotely hosted services that the request is directed towards, as described in greater detail above with reference to FIG. 3A; typically, if one or commands 404 are included in a generic request 402, the request does not also include hosted service IDs 306; and
- command parameters 406 that provide customization information for the command (e.g., the command is to get photos from FLICKR and then get associated map data from GOOGLE MAPS, and the parameters include that the photos must have the tag: "landmark" and be located in San Francisco, Calif.).

The generic request 402 is passed from the client 104 to the request processing module 220 at the server system 102. In some embodiments, the request processing module 220 uses the user account ID 241 to retrieve user account information (e.g., request processing instructions) from the profile database 118, selects one or more remotely hosted services 106 from the API database 114, and generates a respective API-specific request for each of the selected remotely hosted services 106 based on the generic request 402 from the client 104. The respective API-specific requests are translated by the request translation module 222 using information about the API(s) used by the remotely hosted service that is stored in the API database 114 so that the requests use appropriate API-specific syntax for the respective APIs of the remotely hosted services 106. The respective API-specific requests are then transmitted from the server system 102 to the remotely hosted services 106 by the request transmission module 224, which determines transmission information based on information in the API database 114 for each respective API-specific request. In some embodiments, the transmission information includes one or more of: addressing of the respective request, communication protocols for the respective remotely hosted service, and security credentials for the respective request.

The respective API-specific requests are each transmitted to a respective one of the remotely hosted services (e.g., remotely hosted service 1 106-1, remotely hosted service 2 106-2, remotely hosted service 3 106-3, remotely hosted service 4 106-4 or remotely hosted service 5 106-5). The server system 102 receives API-specific responses from one or more of the remotely hosted services 106. The API-specific responses from the remotely hosted services 106 are processed by the response processing module 226, which translates the API-specific responses into a generic format based on information about the respective APIs from the API database 114. In other words, the syntax of the API-specific responses is normalized so that they can be more easily combined and presented to the client in a standardized format. It should be understood that in some embodiments, the responses received by the response processing module 226 are used to generate subsequent API-specific requests in accordance with request processing instructions stored in the profile database 118 as described in greater detail below with reference to FIGS. 5A-5F.

It should be understood that in some circumstances one or more of the remotely hosted services may fail to send a reply to the API-specific request (e.g., no reply is received from the remotely hosted service within a predefined "timeout" time period). In some embodiments, in the case of a failure to receive a reply from a remotely hosted service, the server system 102 resends the API-specific request to the remotely hosted service. In some embodiments failure to receive a reply from the remotely hosted service produces an error message, and the server system 102 aborts the API-specific request based on the type of error (e.g., if the error is determined to be fatal, then no further requests will be attempted, while if the error is merely the result of a time-out, then the request will be retried after a predetermined amount of time has passed since the most recent attempt). In some embodiments, the server system 102 ignores any failures to receive a reply from the remotely hosted service after a predetermined number of attempts (e.g., a single attempt, five attempts, etc.). In some embodiments, information indicating a failure to receive a reply from one or more of the remotely hosted services is transmitted to the client 104 with the final response.

In some embodiments, once all of the responses from the remotely hosted services 106 have been processed by the response processing module 226, the processed responses are passed to the final response generation module 228. The final response generation module 228 combines the processed responses into a final response, and the final response 408 is transmitted from the server system 102 to the client 104. In some embodiments, as part of generating the final response 408, the final response generation module 228 further processes the responses based on information in the profile database 118 that specifies output preferences of the user (e.g., preferences specifying the format of content included in the final response, encryption, etc.). In other words, the server system 102 serves to normalize the API for a plurality of remotely hosted services 106, so that the client 104 can interact with the remotely hosted services 106 through the server system 102 without having to customize requests to each API of the remotely hosted services 106. This is advantageous because it frees the client 104 from the task of ensuring compatibility with the APIs of multiple remotely hosted services, thereby enabling the client 104 operate more effectively and efficiently.

FIGS. 5A-5F are a flowchart representing a method 500 for providing access to remotely hosted services through a normalized application programming interface in accordance with certain embodiments. Method 500 may be governed by instructions that are stored in a computer readable storage medium and that are executed by one or more processors of the server system 102 (FIG. 2). Each of the operations shown in FIGS. 5A-5F may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is executed or interpreted by one or more processors.

In some embodiments the client 104 requests (502) the creation of a user account, and in response to receiving the request, the server system 102 creates (503) a user account. In accordance with some embodiments, the user account is used to identify the user to the server system 102 and to store details about the user's preferences with respect to the processing of requests and the format for responses. In some embodiments, the client 104 sets (504) user account preferences, which are stored (506) by the server system 102 (e.g., stored in the profile database 118 in FIG. 2). In some embodiments, the user account includes (508) a definition for a predefined command and the definition for the predefined command includes identifiers for a plurality of respective remotely hosted services, as described in greater detail above with reference to FIG. 3A. In some embodiments, the predefined command is used to process requests from the client 104, as described in greater detail below.

The client 104 prepares (510) a generic request (e.g., 402 in FIG. 4) to access a plurality of the remotely hosted services 106. Preparing the generic request includes creating a request that is in accordance with the requirements of the server system 102. In other words, the request will typically have a format that is specified by the server system 102 and uses syntax compatible with the server system 102. The client 104 sends (512) the generic request to the server system 102. In some embodiments, the generic request is sent using (514) a user-specified communication protocol. In other words, the client 104 can specify any convenient communication protocol (e.g., SOAP, XML, JSON, REST, etc.) as the preferred protocol for communicating with the server system 102. In accordance with some embodiments, this user-specified communication protocol is used for all communications between the server system 102 and the client 104 without regard to the communication protocol(s) used by the server system 102 to communicate with the remotely hosted services 106. One advantage of this arrangement is that the client 104 does not have to be concerned about the communication protocols that are used by the remotely hosted services 106, and instead can use one consistent, convenient communication protocol for communicating with the server system 102, which then manages all communications with the remotely hosted services 106.

The server system 102 receives (516), from the client 104, the generic request to access remotely hosted services 106. The generic request uses generic parameters (e.g., parameters designated by the server system 102). In some circumstances, the server system 102 communicates with the client 104 using a first predefined communication protocol (e.g., the user-specified communication protocol described in greater detail above) to receive the generic request and to send the final response; and communicates with a respective remotely hosted service using a second predefined communication protocol (e.g., the API-specified communication protocol described in greater detail below) that is distinct from the first predefined communication protocol to send a respective API-specific request and to receive a respective API-specific response. In other words, the server system 102 translates between the communication protocol used by the client 104 and the communication protocol(s) used by the remotely hosted services 106.

In some embodiments the generic request includes (518) identifiers for the plurality of respective remotely hosted services 106. In other words, the generic request may explicitly specify remotely hosted services 106 to which the request is to be transmitted. For example, the request could include a request for photos from FLICKR and PHOTOBUCKET.

In some embodiments, the user account associated with the generic request includes a definition for a command; the definition for the command includes identifiers for the plurality of respective remotely hosted services 106 and the generic request is associated with the user account and includes (520) the command (e.g., a predefined command that is associated with the user account). In other words, in some embodiments, instead of including explicitly identified remotely hosted services (e.g., "get photos from FLICKR and PHOTOBUCKET"), the client 104 includes a predefined command (e.g., "get photos") and the server system 102 interprets the predefined command using information (e.g., request processing instructions) in the profile database (e.g., 118 in FIG. 2) to identify remotely hosted services (e.g., FLICKR and PHOTOBUCKET) to which the generic request refers, as described in greater detail above with reference to FIG. 3A.

The server system 102 identifies (522) a plurality of respective remotely hosted services 106 that correspond to the generic request. The remotely hosted services 106 are each associated with a respective API. In some circumstances, the remotely hosted services 106 are identified (524) based on identifiers included in the generic request (e.g., the remotely hosted services 106 are explicitly identified in the generic request, as described in greater detail above). In other circumstances, the remotely hosted services 106 are identified (526) based on the remotely hosted services 106 that are associated with the predefined command in the user account (e.g., the remotely hosted services 106 are identified in the request processing instructions associated with the predefined command in the profile database 118 in FIG. 2, as described in greater detail above with reference to FIG. 3A).

For each respective remotely hosted service 106, the server system 102 translates (528) the generic request to a respective API-specific request to access the respective remotely hosted service 106 using API-specific parameters. The API-specific request and the API-specific parameters are specific to the respective API of the respective remotely hosted service 106. For example if an API for a remotely hosted service 106 has a plurality of required fields for any request to the API, the server system 102 will use the data in the generic request received from the client 104 as well as information about the API from the API database (e.g., 114 in FIGS. 1-2 and 4) to fill out the fields to generate an API-specific request for the API.

In some embodiments, the generic request includes (530) a request to perform an operation using a generic name for the operation, and translating the generic request to a respective API-specific request includes translating (532) the generic name for the operation to an API-specific name for the operation. In other words, when the generic request includes a request to perform a generic-named operation, translating the generic request to a respective API-specific request includes translating the request to perform the generic-named operation to an API-specific request to perform an API-specific-named operation at the respective remotely hosted service, where the API-specific-named operation is analogous to the generic-named operation. For example, when the operation is retrieving photos, the generic name for the operation is "get photos," while the API-specific name for this operation is "retrieve images" for FLICKR and the API-specific name for this operation is "download pictures" for PHOTOBUCKET. In this example, the server system 102 translates from the generic name of the operation to the API-specific name for the operation so that the desired operation is performed at each of the remotely hosted services (e.g., FLICKR and PHOTO- BUCKET). Name translation between the generic name and the API-specific name(s) for an operation is advantageous for users, because it allows the client 104 to request that a particular operation be performed at multiple remotely hosted services 106 using a single generic name for the operation rather than keeping track of each of the individual API-specific names for the same operation. In addition, name translation improves the efficiency and accuracy of accessing remotely hosted services by normalizing communications between the client 104 and the remotely hosted services 106.

For each of the plurality respective remotely hosted services 106, the server system 102 sends (534) the respective API-specific request to the respective remotely hosted service 106. It should be understood that any number of API-specific requests could be sent to any number of remotely hosted services 106. For example, in FIG. 5C, an API-specific request is sent to each of M different remotely hosted services 106. As another example, as illustrated in FIG. 4, the API-specific request is sent to five different remotely hosted services 106. While the examples given herein illustrate sending API-specific requests to different remotely hosted services 106, it should be understood that in some circumstances API-specific requests could be sent to different APIs within the same remotely hosted service or to the same API within the same remotely hosted service.

In some embodiments, the server system 102 stores a user account, and the user account includes previously registered user-supplied security credentials associated with a particular remotely hosted service 106. In these embodiments, the server system 102 determines whether the API requires authentication (e.g., by retrieving API authentication data from the API database 114 in FIG. 2). If the API does (536) require authentication, the server system 102 retrieves (538) the previously registered user-supplied security credentials associated with the particular remotely hosted service 106 (e.g., a password, user name and/or API for the respective API, as illustrated in FIG. 3B above). In these embodiments sending a particular API-specific request from the server system 102 to the particular remotely hosted service 106 includes authenticating the particular API-specific request using the user-supplied security credentials for the particular remotely hosted service 106. In other words, the server system 102 includes (540) the user-supplied security credentials with the request to the remotely hosted service 106 so as to authenticate the request. However, if the API does not (542) require authentication, then the authentication process ends (543), as no security credentials need be sent to the remotely hosted service 106 with the API-specific request.

In some embodiments, (e.g., in embodiments where the generic request includes a request to perform an operation using a generic name for the operation and the server system 102 translates the generic name for the operation to an API-specific name for the operation), as part of sending the respective API-specific request to the respective remotely hosted service 106, the server system 102 sends (544), to the respective remotely hosted service 106, a request to perform the operation using the API-specific name for the operation. For example, when the operation is retrieving photos, the generic name for the operation is "get photos," and the API-specific name this operation is "retrieve images" for FLICKR and "download pictures" for PHOTOBUCKET, the server system 102 sends an API-specific request to FLICKR that includes a request to "retrieve images" and sends an API-specific request to PHOTOBUCKET that includes a request to "download pictures." In some embodiments, the server system 102 sends (546) the API-specific request using an API-specified communication protocol (e.g., SOAP, XML, JSON, REST, etc.).

As discussed above, the API-specific requests could be sent to any number of remotely hosted services 106. However, for the sake of simplicity, the response of a single remotely hosted service 106 to receiving (548) a respective one of the API-specific requests is described herein. It should be understood that analogous processes may also be performed at one or more additional remotely hosted services 106. When authentication is required by the remotely hosted service, after receiving the API-specific request, the remotely hosted service 106 authenticates (550) the API-specific request using the security credentials provided by the server system 102. In some embodiments, multiple communications between the server system 102 and the remotely hosted service 106 are required to properly authenticate the API-specific request. After (optionally) authenticating the API-specific request, the remotely hosted service 106 prepares (552) an API-specific response to the API-specific request and sends (554) the API-specific response to the server system 102. Typically, the API-specific response includes content requested by the client 104 (e.g., photos, map data, location data, package tracking data, etc.). In some embodiments, the remotely hosted service 106 sends the API-specific reply using the API-specified communication protocol (e.g., SOAP, XML, JSON, REST, etc.). In some embodiments, respective ones of the remotely hosted services 106 use different API-specified communication protocols. Additionally, in some embodiments the API-specified communication protocol for at least one of the respective remotely hosted services is distinct from the user-specified communication protocol that is used by the client 104 to communicate with the server system 102.

In response to the API-specific requests, the server system 102 receives (556), from a plurality of the respective remotely hosted services 106, respective API-specific responses, where a respective API-specific response for a respective remotely hosted service 106 includes respective content (e.g., the photos, map data, location data, package tracking data, etc. requested in the API-specific request). For example, in FIG. 5C, an API-specific response is received from each of N different remotely hosted services 106. In some embodiments, an API-specific response is received from each of the remotely hosted services 106 to which an API-specific request was sent (e.g., M=N). In some embodiments, an API-specific response is only received for a subset of the remotely hosted services 106 to which an API-specific request was sent (e.g., M>N).

While the API-specific requests are typically sent to multiple (e.g., M>1) remotely hosted services 106, it should be understood that, in some circumstances, an API specific request is initially sent only to a single (e.g., M=1) remotely hosted service 106. This is particularly likely in situations where the generic request from the client includes a command and the request processing instructions (e.g., request processing instructions 304-2 for cascading requests in FIG. 3A) include the requirement that the response from the remotely hosted service 106 to the first API-specific request is used to generate subsequent API-specific requests for other remotely hosted services 106, as described in greater detail below.

In some embodiments, the server system 102 determines whether the generic request from the client 104 is a cascading request (e.g., whether the generic request includes a command that is associated with request processing instructions that include instructions to perform a cascading series of requests). If the generic request is (558) not a cascading request, the server system 102 proceeds to generate a final response for transmission to the client 104, as described in greater detail below. However, if the generic request is (559) a cascading request (e.g., the generic request includes a command 302-2 that is associated with request processing instructions 304-2 for cascading requests, as illustrated in FIG. 3A), the server system 102 generates (560) an additional API specific request based on the previous API-specific response(s) for the client's generic request.

Specifically, in some embodiments, after sending the first API-specific request to a first remotely hosted service and receiving (556) a first API-specific response from the first remotely hosted service, the server system 102 performs one or more iterations of additional requests to successive remotely hosted services 106 so as to acquire the information requested by the client 104. In one such iteration, the server system 102 generates (560) an additional API-specific request based on the previous API-specific response(s) and sends (562) the additional API-specific request to a second remotely hosted service that is distinct from the first remotely hosted service. Since the additional request is part of a cascading request, the additional API-specific request is based at least in part on the first API-specific response. In some embodiments the additional API-specific request is sent using (564) an API-specified communication protocol that is specified by the second remotely hosted service.

The second remotely hosted service receives (566) the additional API-specific request. In some circumstances, after receiving the API-specific request, the second remotely hosted service authenticates the API-specific request using security credentials provided by the server system 102, as described in greater detail above. After (optionally) authenticating the API-specific request, the remotely hosted service prepares (568) a second API-specific response to the additional API-specific request and sends (570) the API-specific response to the server system 102. Typically, the API-specific response includes content requested by the client 104 (e.g., photos, map data, location data, package tracking data, etc.). If required by the API of the second remotely hosted service, the second remotely hosted service sends the API-specific reply using (571) the API-specified communication protocol (e.g., SOAP, XML, JSON, REST, etc.). In some circumstances, the API-specified communication protocol used to communicate with the second remotely hosted service is distinct from the API-specified communication protocol used to communicate with the first remotely hosted service. The server system 102 receives (572) the second API-specific response from the second remotely hosted service.

While an embodiment has been described above with respect to a single iteration (e.g., where the first response to a first request is used to generate a second request), it should be understood that any number of iterations could be performed, depending on what is specified by the request processing instructions. As one example, a user has a command (e.g., "geotagged friend photos" user=Dan) for retrieving geotagged photos of friends of a user and map data associated with the locations of the photos, where three remotely hosted services are involved (e.g., a list of contacts is retrieved from a social networking website such as FACEBOOK, photos of the contacts are retrieved from a photo website such as FLICKR and map data that is based on the locations associated with the photos is retrieved from GOOGLE MAPS).

In this example, the user has set up a command with request processing instructions for a cascading request (e.g., 304-2 in FIG. 3A). The server system 102 performs the following operations in response to receiving a generic request from the client 104 that includes the command "geotagged friend photos" user=Dan. In the first iteration, the server system generates a request for the contact retrieval API for FACEBOOK for contacts of the user Dan and sends the request. The server system 102 subsequently receives the contact list from FACEBOOK. In the second iteration, the server system 102 uses the contact list to generate a request for a photo retrieval API for FLICKR for photos that are tagged with the identified contacts, and sends the request. The server system 102 subsequently receives the photos from FLICKR. In the third iteration, the server system 102 uses location information from the retrieved photos to generate a request for a map data retrieval API for GOOGLE MAPS for map data for the identified location information. The server system 102 subsequently receives the map data from GOOGLE MAPS. After the map data has been received, the server system 102 generates a final response for the client 104 that includes at least a subset of the content (e.g., the photos and the map data). In some embodiments all of the content is included in the final response. In some embodiments only a subset of the content is included in the response (e.g., the contacts for the user Dan are not included in the response). While the preceding example has been given with respect to a cascading request included in request processing instructions associated with a command, it should be understood that the cascading request could alternatively be explicitly stated in the generic request sent to the server system 102.

After receiving the API-specific responses (e.g., after receiving more than a threshold number or percentage of API-specific responses, or after determining that there are no further iterations of the cascading request to perform), the server system 102 generates (574) a final response (e.g., 408 in FIG. 4) that includes content from two or more of the API-specific responses (e.g., from two API-specific responses from parallel API-specific requests, or two sequential API-specific responses from a set of cascading API-specific requests).

In some embodiments, the respective API-specific response for a respective remotely hosted service includes (576) one or more respective API-specific return parameters. In these embodiments, the server system 102 translates (578) the one or more respective API-specific return parameters into generic return parameters. In some circumstances, the return parameters include metadata describing the content. In some circumstances, the return parameters include fields that organize the content. For example, in FLICKR, the dates for photos may be formatted as MM-DD-YY, while in PHOTOBUCKET the dates for photos are formatted as YYYY-MM-DD. In this example, the server system 102 would standardize the date formats so that all of the photos are labeled with consistent date information. It should be understood that the return parameters may include one or more of file locations, file sizes, measurements, or any other value associated with an electronic file that has a plurality of accepted formats.

In some embodiments, generating the final response includes: for each of the respective API-specific responses, translating (580) the API-specific response to a respective generic response and combining (582) a plurality of the respective generic responses from a plurality of distinct remotely hosted services to generate the final response. For example, if the server system 102 receives a first response including a set of 10 photos from FLICKR and a second response including a set of 15 photos from PHOTOBUCKET, the server system 102 combines both sets of photos into a single final response that includes all 25 photos.

In some embodiments, the server system 102 processes (584) multiple respective API-specific responses without modifying the content of the multiple respective API-specific responses, and the final response includes the unmodified content of the multiple respective API-specific responses. In other words, while the server system 102 may modify metadata and/or reorganize the content so as to generate a single final response to a single generic request, the individual pieces of content (e.g., photos, contact names, map data, etc.) are passed through from the remotely hosted service(s) 106 to the client 104 unmodified. Passing along content unmodified is advantageous because it allows the client 104 to use the server system 102 to simplify the process of retrieving content from disparate remotely hosted services 106 while still receiving the exact same content that the client 104 would have received had the client 104 requested the content directly from the remotely hosted service 106.

In some embodiments, the final response is translated (586) to a customized response format specified by a user of the client 104 (e.g., a response format specified in the profile database 118 in FIG. 2). For example, the user may specify that all images in the response are sorted in reverse chronological order, or that the response is encrypted using a predefined encryption technique.

In some embodiments, in addition to the normalized response described above (e.g., the portion of the response that includes standardized return parameters and/or customized response format) the final response may also include the API-specific responses that were used to generate the normalized response. In other words the raw data received from the remotely hosted services may be included in the final response in addition to the processed data. Including the API-specific responses in accordance with these embodiments as part of the final response is advantageous because it gives the client 104 access to the exact responses that were received from the remotely hosted services 106, thereby ensuring that any API-specific data that was removed by the server system 102 during the normalization process is still available if it is needed by the client 104. For example, if a client 104 has a first set of one or more programs (e.g., legacy programs) that are configured to process the API-specific responses and a second set of one or more programs (e.g., normalized programs) that are configured to process the normalized response, the client 104 will be able to continue to use both sets of programs based on the final response received from the server system 102. In other words, providing the clients 104 with the raw data received from the remotely hosted services 106 enables clients 104 to transition smoothly from using legacy programs that operate using the API-specific responses to using normalized programs that operate using the normalized response generated by the server system 102.

The server system 102 transmits (588) the final response to the client 104. In some embodiments, the final response is transmitted to the client 104 using (590) the user-specified communication protocol. In other words, as described in greater detail above, the client 104 can specify any convenient communication protocol (e.g., SOAP, XML, JSON, REST, etc.) as the preferred protocol for communicating with the server system 102. The client 104 receives (592) the final response. In some embodiments, additional processing is performed at the client 104 and/or additional generic requests are sent from the client 104 to the server system 102, which are processed in the manner described above.

Each of the methods described herein may be governed by instructions that are stored in a computer readable storage medium and that are executed by one or more processors of one or more servers or clients. Each of the operations shown in FIGS. 5A-5F may correspond to instructions stored in a computer memory or computer readable storage medium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
at a server system having one or more processors and memory:
receiving, from a client, a generic request to access remotely hosted services, wherein the generic request uses generic parameters;
identifying a plurality of respective remotely hosted services that correspond to the generic request, wherein the remotely hosted services are each associated with a respective Application Programming Interface (API);
for each respective remotely hosted service, translating the generic request to a respective API-specific request to access the respective remotely hosted service using API-specific parameters, wherein:
the API-specific request and the API-specific parameters are specific to the respective API of the respective remotely hosted service; and
the translating includes, for a respective generic parameter in the generic request, identifying a corresponding respective API-specific parameter in an API database storing information about API-specific parameters for multiple distinct remotely hosted services, including the respective remotely hosted service, and using the corresponding respective API-specific parameter in place of the respective generic parameter in the respective API-specific request;
for each of the plurality respective remotely hosted services, sending the respective API-specific request to the respective remotely hosted service;
in response to the requests, receiving, from a plurality of the respective remotely hosted services, respective API-specific responses, where a respective API-specific response for a respective remotely hosted service includes respective content;
generating a final response that includes content from two or more of the API-specific responses; and
transmitting, to the client, the final response.

2. The method of claim 1, wherein the generic request includes a request to perform a generic-named operation, and translating the generic request to a respective API-specific request includes translating the request to perform the generic-named operation to an API-specific request to perform an API-specific-named operation at the respective remotely hosted service, wherein the API-specific-named operation is analogous to the generic-named operation.

3. The method of claim 1, wherein:
the generic request includes a request to perform an operation using a generic name for the operation;
translating the generic request to a respective API-specific request includes translating the generic name for the operation to an API-specific name for the operation; and
sending the respective API-specific request to the respective remotely hosted service includes sending, to the respective remotely hosted service, a request to perform the operation using the API-specific name for the operation.

4. The method of claim 1, wherein the method includes:
communicating with the client using a first predefined communication protocol to receive the generic request and to send the final response; and
communicating with a respective remotely hosted service using a second predefined communication protocol that is distinct from the first predefined communication protocol to send a respective API-specific request and to receive a respective API-specific response.

5. The method of claim 1, wherein:
a user account is stored at the server system, the user account including previously registered user-supplied security credentials associated with a particular remotely hosted service; and
sending a particular API-specific request from the server system to the particular remotely hosted service includes authenticating the particular API-specific request using the user-supplied security credentials for the particular remotely hosted service.

6. The method of claim 1, wherein the generic request includes identifiers for the plurality of respective remotely hosted services.

7. The method of claim 1, wherein:
a user account associated with the generic request includes a definition for a command;
the definition for the command includes identifiers for the plurality of respective remotely hosted services; and
the generic request is associated with the user account and includes the command.

8. The method of claim 1, wherein sending respective API-specific requests to the respective remotely hosted services includes:
sending a first API-specific request to a first remotely hosted service;
receiving a first API-specific response from the first remotely hosted service;
sending a second API-specific request to a second remotely hosted service that is distinct from the first remotely hosted service, wherein the second API-specific request is based at least in part on the first API-specific response; and
receiving a second API-specific response from the second remotely hosted service.

9. The method of claim 1, wherein:
the respective API-specific response for a respective remotely hosted service includes one or more respective API-specific return parameters; and
the method includes translating the one or more respective API-specific return parameters into generic return parameters.

10. The method of claim 1, wherein generating the final response includes:
for each of the respective API-specific responses, translating the API-specific response to a respective generic response; and
combining a plurality of the respective generic responses from a plurality of distinct remotely hosted services to generate the final response.

11. The method of claim 10, wherein:
each of the respective API-specific responses includes at least one API-specific return parameter; and
translating a respective API-specific response from a respective remotely hosted service to a respective generic response includes:
retrieving, from the API database, information about formatting of responses from the respective remotely hosted service; and
converting the respective API-specific return parameter to a generic return parameter in accordance with the information retrieved from the API database.

12. The method of claim 1, wherein the method includes processing multiple respective API-specific responses without modifying the content of the multiple respective API-specific responses, and the final response includes the unmodified content of the multiple respective API-specific responses.

13. The method of claim 1, wherein the final response is in a customized response format specified by a user of the client.

14. A server system for providing normalized access to Application Programming Interfaces (APIs) of one or more remotely hosted services at host servers coupled to a communications network, comprising:
one or more processors;
memory; and
one or more programs stored in the memory, the one or more programs comprising instructions executed by the one or more processors for:
receiving, from a client, a generic request to access the remotely hosted services, wherein the generic request uses generic parameters;
identifying a plurality of respective remotely hosted services that correspond to the generic request, wherein the remotely hosted services are each associated with a respective API of the APIs;
for each respective remotely hosted service, translating the generic request to a respective API-specific request to access the respective remotely hosted service using API-specific parameters, wherein:
the API-specific request and the API-specific parameters are specific to the respective API of the respective remotely hosted service; and
the translating includes, for a respective generic parameter in the generic request, identifying a corresponding respective API-specific parameter in an API database storing information about API-specific parameters for multiple distinct remotely hosted services, including the respective remotely hosted service, and using the corresponding respective API-specific parameter in place of the respective generic parameter in the respective API-specific request;
for each of the plurality respective remotely hosted services, sending the respective API-specific request to the respective remotely hosted service;
in response to the requests, receiving, from a plurality of the respective remotely hosted services, respective API-specific responses, where a respective API-specific response for a respective remotely hosted service includes respective content;
generating a final response that includes content from two or more of the API-specific responses; and
transmitting, to the client, the final response.

15. The server system of claim 14, wherein the generic request includes a request to perform a generic-named operation, and translating the generic request to a respective API-specific request includes translating the request to perform the generic-named operation to an API-specific request to perform an API-specific-named operation at the respective remotely hosted service, wherein the API-specific-named operation is analogous to the generic-named operation.

16. The server system of claim 14, wherein:
the generic request includes a request to perform an operation using a generic name for the operation;
translating the generic request to a respective API-specific request includes translating the generic name for the operation to an API-specific name for the operation; and
sending the respective API-specific request to the respective remotely hosted service includes sending, to the respective remotely hosted service, a request to perform the operation using the API-specific name for the operation.

17. The server system of claim 14, wherein generating the final response includes:
for each of the respective API-specific responses, translating the API-specific response to a respective generic response; and
combining a plurality of the respective generic responses from a plurality of distinct remotely hosted services to generate the final response.

18. The server system of claim 17, wherein:
each of the respective API-specific responses includes at least one API-specific return parameter; and
translating a respective API-specific response from a respective remotely hosted service to a respective generic response includes:
retrieving, from the API database, information about formatting of responses from the respective remotely hosted service; and
converting the respective API-specific return parameter to a generic return parameter in accordance with the information retrieved from the API database.

19. The server system of claim 14, wherein the one or more programs further comprise instructions for:
communicating with the client using a first predefined communication protocol to receive the generic request and to send the final response; and
communicating with a respective remotely hosted service using a second predefined communication protocol that is distinct from the first predefined communication protocol to send a respective API-specific request and to receive a respective API-specific response.

20. The server system of claim 14, wherein:
a user account is stored at the server system, the user account including previously registered user-supplied security credentials associated with a particular remotely hosted service; and
sending a particular API-specific request from the server system to the particular remotely hosted service includes authenticating the particular API-specific request using the user-supplied security credentials for the particular remotely hosted service.

21. The server system of claim 14, wherein the generic request includes identifiers for the plurality of respective remotely hosted services.

22. The server system of claim 14, wherein:
a user account associated with the generic request includes a definition for a command;
the definition for the command includes identifiers for the plurality of respective remotely hosted services; and
the generic request is associated with the user account and includes the command.

23. The server system of claim 14, wherein sending respective API-specific requests to the respective remotely hosted services includes:
sending a first API-specific request to a first remotely hosted service;
receiving a first API-specific response from the first remotely hosted service;
sending a second API-specific request to a second remotely hosted service that is distinct from the first remotely hosted service, wherein the second API-specific request is based at least in part on the first API-specific response; and
receiving a second API-specific response from the second remotely hosted service.

24. The server system of claim 14, wherein:
the respective API-specific response for a respective remotely hosted service includes one or more respective API-specific return parameters; and
the one or more programs further comprise instructions for translating the one or more respective API-specific return parameters into generic return parameters.

25. The server system of claim 14, wherein the one or more programs further comprise instructions for processing multiple respective API-specific responses without modifying the content of the multiple respective API-specific responses, and the final response includes the unmodified content of the multiple respective API-specific responses.

26. The server system of claim 14, wherein the final response is in a customized response format specified by a user of the client.

27. A non-transitory computer readable storage medium storing one or more programs configured for execution by one or more processors of a server system, the one or more programs comprising instructions to be executed by the one or more processors so as to:
receive, from a client, a generic request to access remotely hosted services, wherein the generic request uses generic parameters;
identify a plurality of respective remotely hosted services that correspond to the generic request, wherein the remotely hosted services are each associated with a respective Application Programming Interface (API);
for each respective remotely hosted service, translate the generic request to a respective API-specific request to access the respective remotely hosted service using API-specific parameters, wherein:
the API-specific request and the API-specific parameters are specific to the respective API of the respective remotely hosted service; and
the translating includes, for a respective generic parameter in the generic request, identifying a corresponding respective API-specific parameter in an API database storing information about API-specific parameters for multiple distinct remotely hosted services, including the respective remotely hosted service, and using the corresponding respective API-specific parameter in place of the respective generic parameter in the respective API-specific request;
for each of the plurality respective remotely hosted services, send the respective API-specific request to the respective remotely hosted service;
in response to the requests, receive, from a plurality of the respective remotely hosted services, respective API-specific responses, where a respective API-specific response for a respective remotely hosted service includes respective content;
generate a final response that includes content from two or more of the API-specific responses; and
transmit, to the client, the final response.

28. The non-transitory computer readable storage medium of claim 27, wherein the generic request includes a request to perform a generic-named operation, and translating the generic request to a respective API-specific request includes translating the request to perform the generic-named operation to an API-specific request to perform an API-specific-named operation at the respective remotely hosted service, wherein the API-specific-named operation is analogous to the generic-named operation.

29. The non-transitory computer readable storage medium of claim 27, wherein:
   the generic request includes a request to perform an operation using a generic name for the operation;
   translating the generic request to a respective API-specific request includes translating the generic name for the operation to an API-specific name for the operation; and
   sending the respective API-specific request to the respective remotely hosted service includes sending, to the respective remotely hosted service, a request to perform the operation using the API-specific name for the operation.

30. The non-transitory computer readable storage medium of claim 27, wherein generating the final response includes:
   for each of the respective API-specific responses, translating the API-specific response to a respective generic response; and
   combining a plurality of the respective generic responses from a plurality of distinct remotely hosted services to generate the final response.

31. The non-transitory computer readable storage medium of claim 30, wherein:
   each of the respective API-specific responses includes at least one API-specific return parameter; and
   translating a respective API-specific response from a respective remotely hosted service to a respective generic response includes:
      retrieving, from the API database, information about formatting of responses from the respective remotely hosted service; and
      converting the respective API-specific return parameter to a generic return parameter in accordance with the information retrieved from the API database.

32. The non-transitory computer readable storage medium of claim 27, wherein the one or more programs further comprise instructions for:
   communicating with the client using a first predefined communication protocol to receive the generic request and to send the final response; and
   communicating with a respective remotely hosted service using a second predefined communication protocol that is distinct from the first predefined communication protocol to send a respective API-specific request and to receive a respective API-specific response.

33. The non-transitory computer readable storage medium of claim 27, wherein:
   a user account is stored at the server system, the user account including previously registered user-supplied security credentials associated with a particular remotely hosted service; and
   sending a particular API-specific request from the server system to the particular remotely hosted service includes authenticating the particular API-specific request using the user-supplied security credentials for the particular remotely hosted service.

34. The non-transitory computer readable storage medium of claim 27, wherein the generic request includes identifiers for the plurality of respective remotely hosted services.

35. The non-transitory computer readable storage medium of claim 27, wherein:
   a user account associated with the generic request includes a definition for a command;
   the definition for the command includes identifiers for the plurality of respective remotely hosted services; and
   the generic request is associated with the user account and includes the command.

36. The non-transitory computer readable storage medium of claim 27, wherein sending respective API-specific requests to the respective remotely hosted services includes:
   sending a first API-specific request to a first remotely hosted service;
   receiving a first API-specific response from the first remotely hosted service;
   sending a second API-specific request to a second remotely hosted service that is distinct from the first remotely hosted service, wherein the second API-specific request is based at least in part on the first API-specific response; and
   receiving a second API-specific response from the second remotely hosted service.

37. The non-transitory computer readable storage medium of claim 27, wherein:
   the respective API-specific response for a respective remotely hosted service includes one or more respective API-specific return parameters; and
   the one or more programs further comprise instructions for translating the one or more respective API-specific return parameters into generic return parameters.

38. The non-transitory computer readable storage medium of claim 27, wherein the one or more programs further comprise instructions for processing multiple respective API-specific responses without modifying the content of the multiple respective API-specific responses, and the final response includes the unmodified content of the multiple respective API-specific responses.

39. The non-transitory computer readable storage medium of claim 27, wherein the final response is in a customized response format specified by a user of the client.

* * * * *